United States Patent
Kuramoto et al.

(10) Patent No.: US 11,466,769 B2
(45) Date of Patent: Oct. 11, 2022

(54) GEAR UNIT

(71) Applicant: SUBARU CORPORATION, Tokyo (JP)

(72) Inventors: Yuya Kuramoto, Tokyo (JP);
Shunsuke Fukamachi, Tokyo (JP);
Tadao Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 211 days.

(21) Appl. No.: 16/745,513

(22) Filed: Jan. 17, 2020

(65) Prior Publication Data

US 2020/0309245 A1    Oct. 1, 2020

(30) Foreign Application Priority Data

Mar. 25, 2019   (JP) .............................. JP2019-056000

(51) Int. Cl.
*F16H 57/04* (2010.01)
*F16H 48/36* (2012.01)

(52) U.S. Cl.
CPC ..... *F16H 57/0424* (2013.01); *F16H 57/0435* (2013.01); *F16H 57/0453* (2013.01); *F16H 2048/364* (2013.01)

(58) Field of Classification Search
CPC ............. F16H 57/0424; F16H 57/0428; F16H 57/0431; F16H 57/0453; F16H 57/0457; F16H 57/0458; F16H 57/0435; F16H 57/0476; F16H 57/0475; F16H 2048/364
See application file for complete search history.

(56) References Cited

U.S. PATENT DOCUMENTS

| | | | | |
|---|---|---|---|---|
| 4,495,830 A | * | 1/1985 | Yasue | .................. F16H 57/0423 74/467 |
| 2018/0180164 A1 | | 6/2018 | Hagino | |
| 2019/0234508 A1 | * | 8/2019 | Francis | ............... F16H 57/0423 |
| 2019/0249764 A1 | * | 8/2019 | Ono | ..................... F16H 57/0457 |

FOREIGN PATENT DOCUMENTS

| | | | |
|---|---|---|---|
| DE | 127107 A | * 9/1977 | |
| JP | 2008-286247 A | 11/2008 | |
| JP | 2012-102856 A | 5/2012 | |
| JP | 2018-105419 A | 7/2018 | |
| WO | WO-2007017221 A1 | * 2/2007 | ......... F16H 57/0447 |

* cited by examiner

*Primary Examiner* — Daniel D Yabut
(74) *Attorney, Agent, or Firm* — Troutman Pepper Hamilton Sanders LLP

(57) ABSTRACT

A gear unit to be mounted in a vehicle includes a housing for storing oil, a partition disposed inside the housing, and a helical gear. The partition defines first and second oil chambers and has a through-hole allowing the first oil chamber to communicate with the second oil chamber. The helical gear disposed inside the first oil chamber rotates during running of the vehicle and has an angled tooth that draws inner and addendum circles defining a virtual circumferential plane. The through-hole coincides with a portion of the virtual circumferential plane in a direction parallel to a central axis of the helical gear. When the helical gear rotates in conjunction with the running of the vehicle, the oil flows from the second oil chamber into the first oil chamber so that an oil level of the first oil chamber becomes higher than that of the second oil chamber.

12 Claims, 14 Drawing Sheets

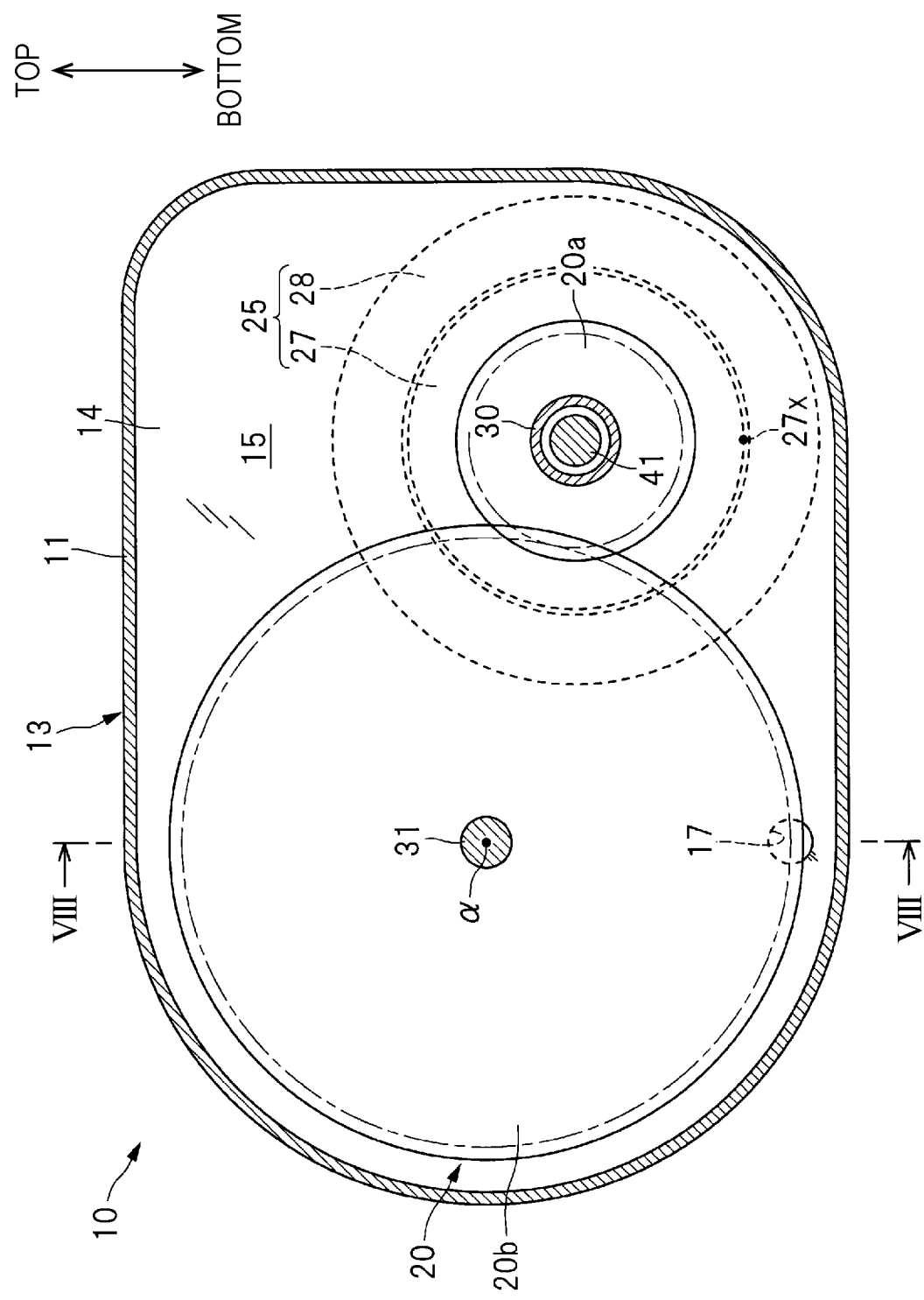

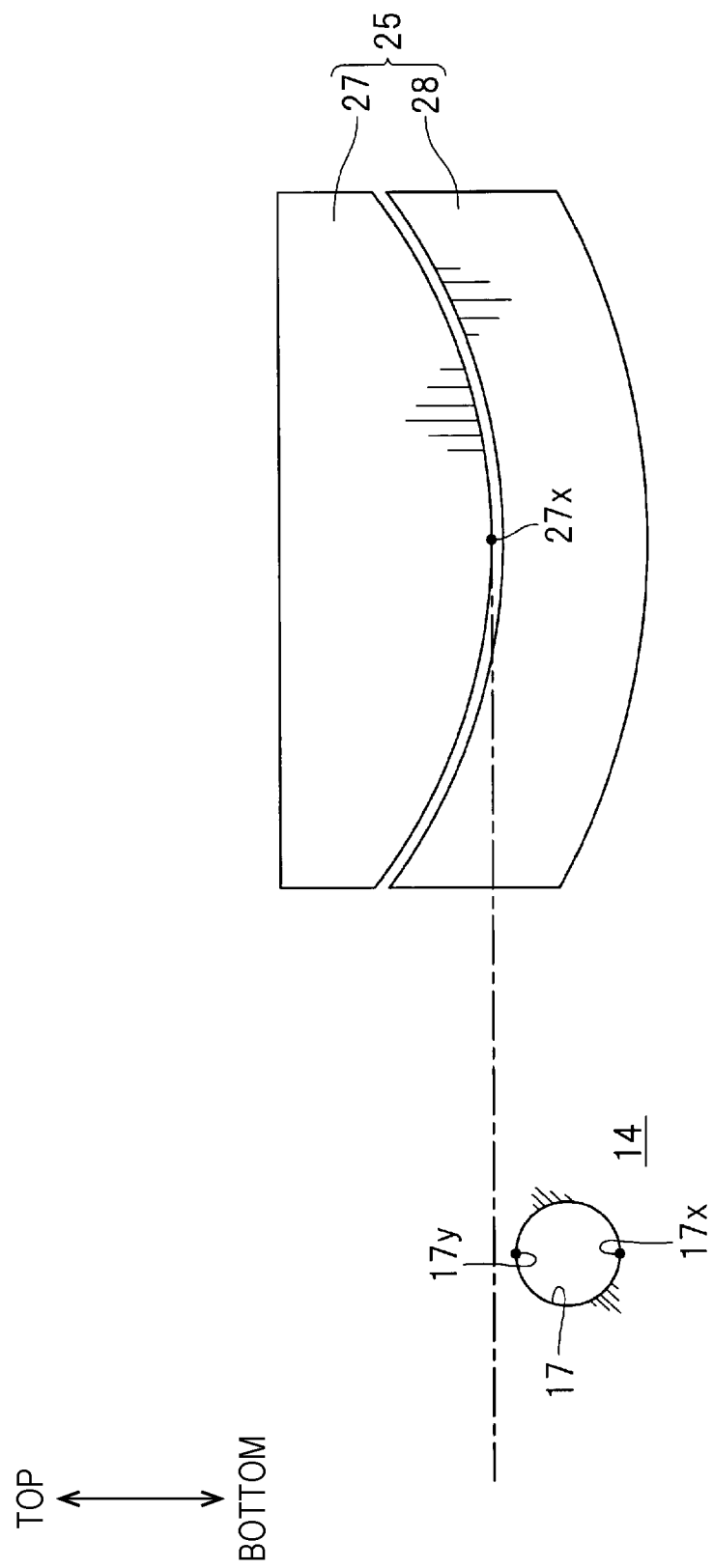

GEAR UNIT

CROSS-REFERENCE TO RELATED APPLICATIONS

The present application claims priority from Japanese Patent Application No. 2019-056000 filed on Mar. 25, 2019, the entire contents of which are hereby incorporated by reference.

BACKGROUND

The disclosure relates to a gear unit mounted in a vehicle.

Most automobiles and other vehicles are equipped with gear units such as drive axles and transmissions, as disclosed in Japanese Unexamined Patent Application Publication Nos. 2008-286247, 2018-105419, and 2012-102856. A gear unit has a housing that contains oil to be supplied to a slide member, an actuator, and other internal parts during the running of the vehicle.

SUMMARY

An aspect of the disclosure provides a gear unit to be mounted in a vehicle. The gear unit includes a housing, a partition, and a helical gear. The housing is configured to store oil. Disposed inside the housing, the partition defines a first oil chamber and a second oil chamber and has a through-hole that allows the first oil chamber to communicate with the second oil chamber. Disposed inside the first oil chamber, the helical gear is configured to rotate during running of the vehicle. The helical gear has an angled tooth, a tip of which draws an addendum circle and a bottom of which draws a root circle. Both of the addendum and root circles define a virtual circumferential plane. The through-hole coincides with a portion of the virtual circumferential plane in an axial direction parallel to a central axis of the helical gear. When the helical gear rotates in conjunction with the running of the vehicle, the oil flows from the second oil chamber into the first oil chamber so that an oil level of the first oil chamber becomes higher than an oil level of the second oil chamber.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 4 illustrates the cross-sections of the reduction gear train and the motor taken along the line IV-IV in FIG. 3;

FIG. 6 illustrates the arrangement of the motor and the through-hole;

DETAILED DESCRIPTION

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

If oil contained in the housing of a gear unit is set at a high level, the oil is supplied stably to the slide member and other parts, but the rotational resistance of the gear unit may increase. If the oil is set at a low level, the rotational resistance decreases, but the oil may be supplied unstably to the slide member and other parts. Therefore, the gear unit is requested to vary the oil level, depending on its operational state.

It is desirable to provide a gear unit that can vary an oil level in the housing, depending on its operational state.

Drive Axle

Figure 1:
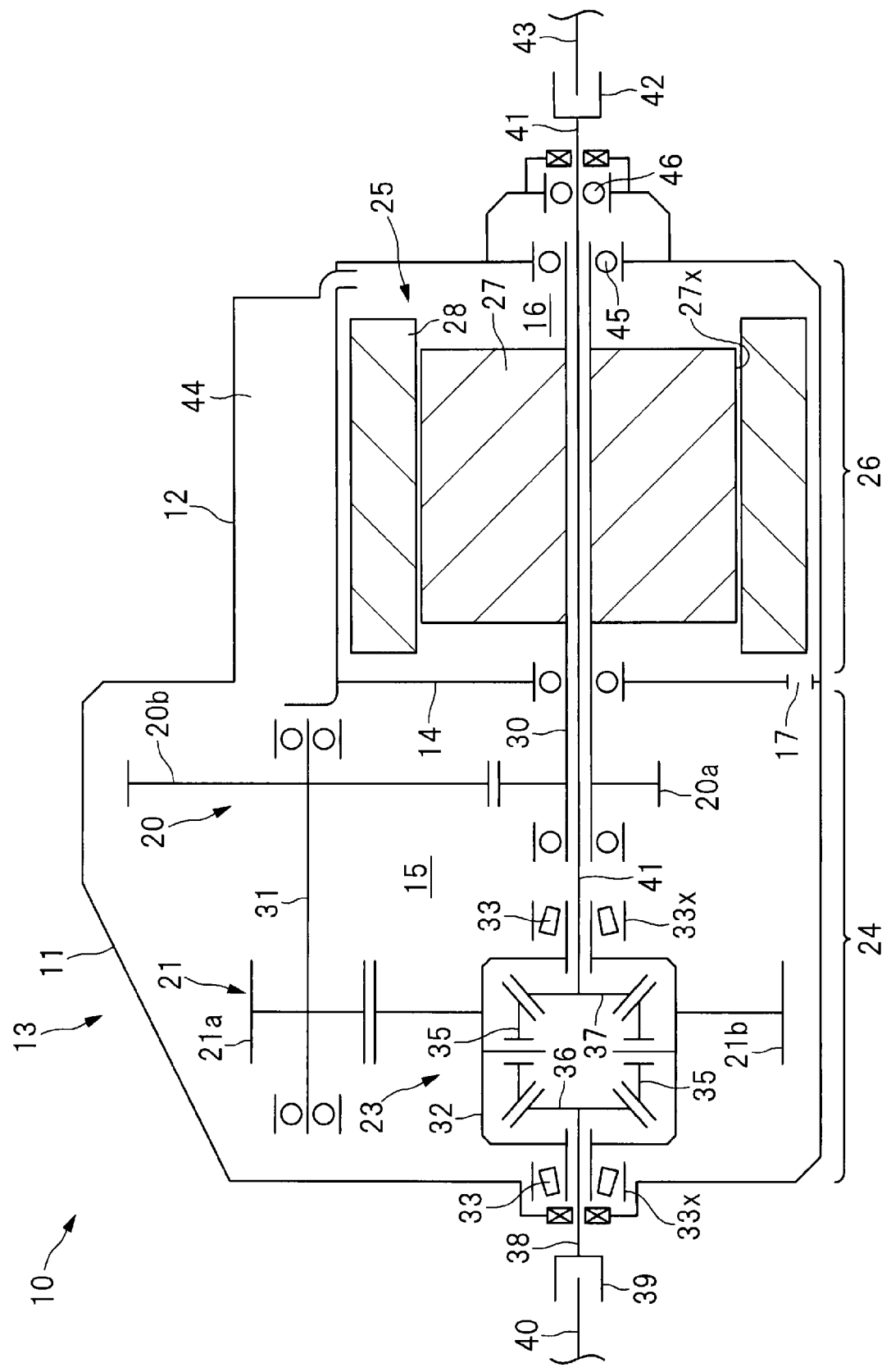
FIG. 1 illustrates a drive axle, which is a gear unit according to a first embodiment of the disclosure.

FIG. 1 illustrates a drive axle 10, which is a gear unit according to a first embodiment of the disclosure. The drive axle 10 is mounted in a vehicle, such as an automobile, in order to drive unillustrated right and left wheels.

As illustrated in FIG. 1, the drive axle 10 includes a housing 13 constituted by a gear housing 11 and a motor housing 12. The housing 13 has a partition 14 inside which defines a gear chamber 15 and a motor chamber 16. In one embodiment, the gear chamber 15 may serve as a first oil chamber, and the motor chamber 16 may serve as a second oil chamber. The partition 14 has a lower portion with a through-hole 17, via which the gear chamber 15 communicates with the motor chamber 16. The drive axle 10 further includes a deceleration section 24 and a motor section 26.

The deceleration section 24 has reduction gear trains 20 and 21 and a differential mechanism 23, all of which are disposed inside the gear chamber 15. The motor section 26 has a motor 25 disposed inside the motor chamber 16. The motor 25, which serves as a power source, has a rotor 27 and a stator 28; the stator 28 is disposed on the circumference of the rotor 27.

In the gear chamber 15 within the gear housing 11, a hollow motor shaft 30 extends and is coupled to the rotor 27 of the motor 25. Disposed parallel to the hollow motor shaft 30 is an intermediate shaft 31, and disposed parallel to the intermediate shaft 31 is a differential case 32. The hollow motor shaft 30 is provided with a drive gear 20a, whereas the intermediate shaft 31 is provided with a driven gear 20b. The drive gear 20a and the driven gear 20b engage with each other to constitute the reduction gear train 20. The intermediate shaft 31 is provided with a drive gear 21a, whereas the differential case 32 is provided with a driven gear 21b. The drive gear 21a and the driven gear 21b engage with each other to constitute the reduction gear train 21. In short, the rotor 27 of the motor 25 is coupled to the differential case 32 via the reduction gear trains 20 and 21, which constitute a two-stage reduction gear train.

The differential case 32 in the differential mechanism 23 is supported by a pair of bearings 33 and contains a plurality of differential gears: pinions 35 rotatable together with the differential case 32; and a pair of side gears 36 and 37 that engage with each other via the pinions 35. The side gear 36 is coupled to a drive shaft 40 via an output shaft 38 and a joint 39, and the drive shaft 40 is coupled to an unillustrated wheel. Likewise, the side gear 37 is coupled to a drive shaft 43 via an output shaft 41 and a joint 42, and the drive shaft 43 is coupled to another unillustrated wheel.

The hollow motor shaft 30 has a rotational center identical to that of the differential case 32. The output shaft 41 extends from the differential case 32 while penetrating the hollow motor shaft 30 in its axial direction. For instance, the bearings 33 that support the differential case 32 may each be a conical bearing that possesses a capacity of withstanding heavy load.

Oil Level

Figure 2:
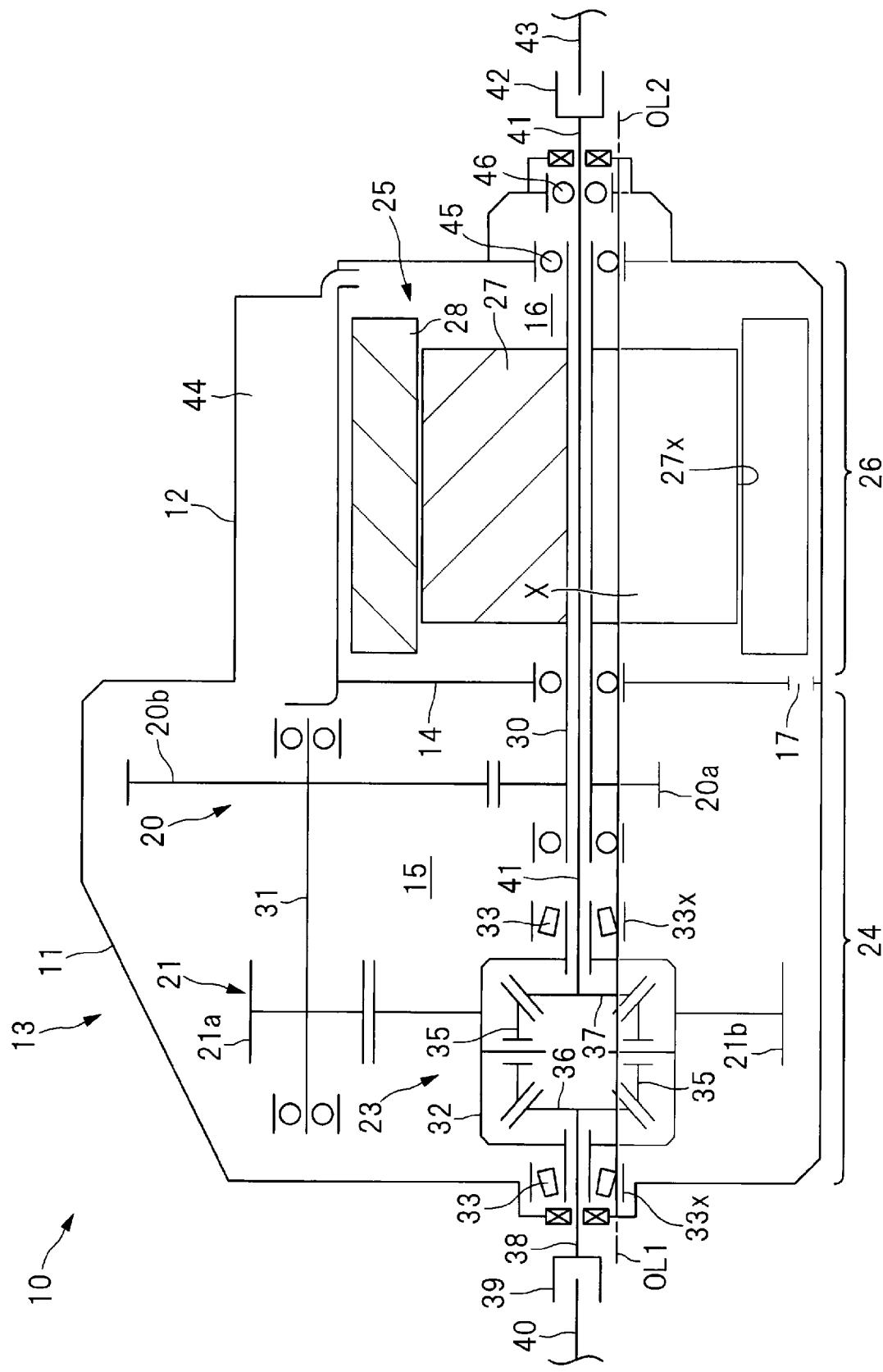
FIG. 2 illustrates the configuration of the drive axle during the stop of the vehicle.
Figure 3:
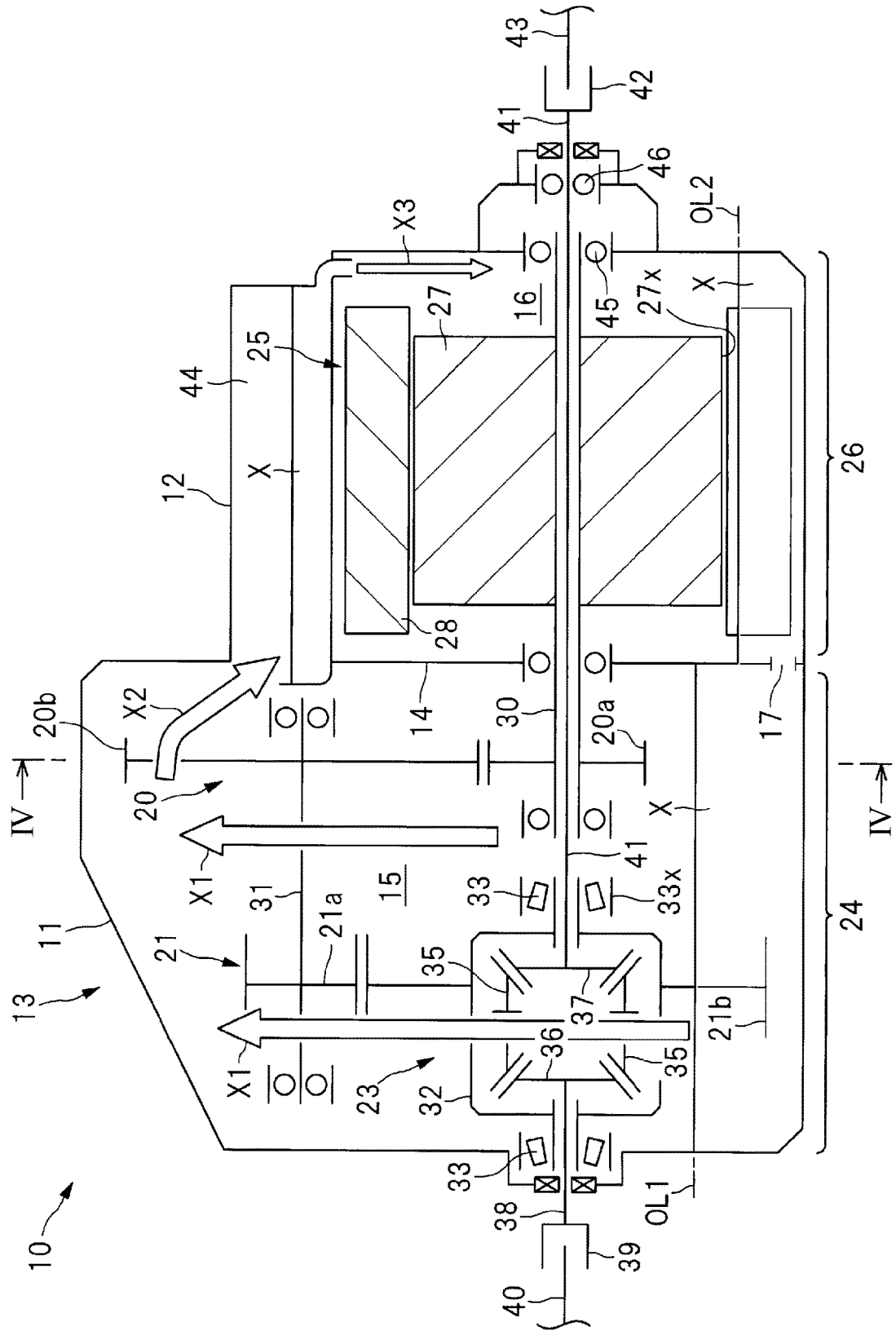
FIG. 3 illustrates the configuration of the drive axle during the running of the vehicle.

Next, oil levels OL1 and OL2 will be described below. The oil level OL1 indicates the surface height of an oil X in the gear chamber 15, and the oil level OL2 indicates the surface height of the oil X in the motor chamber 16. FIG. 2 illustrates the configuration of the drive axle 10 during the stop of the vehicle; FIG. 3 illustrates the configuration of the drive axle 10 during the running of the vehicle. As illustrated in FIG. 2, the housing 13 of the drive axle 10 contains the oil X for use in lubricating moving parts. As illustrated in FIG. 3, during the running of the vehicle, the reduction gear trains 20 and 21 and some other members scoop up the oil X, thereby supplying the oil X to individual slide members in the housing 13.

As illustrated in FIG. 2, during the stop of the vehicle, the oil level OL1 of the gear chamber 15 is set such that the oil X makes contact with lower edges 33x of outer rings of the bearings 33 that support the differential case 32. In other words, the oil level OL1 is set above the lower edges 33x of the bearings 33. Setting the oil level OL1 in this manner enables the hollow motor shaft 30 to move smoothly on the bearings 33. Besides, the lower edges 33x of the bearings 33 are positioned above a lower edge 27x of the rotor 27 of the motor 25. If the oil level OL1 increases in order to make the hollow motor shaft 30 move more smoothly on the bearings 33, the portion of the rotor 27 below the bearings 33 is immersed in the oil X. In short, the lower edge 27x of the rotor 27 of the motor 25 is positioned below the oil level OL2 of the motor chamber 16. During the stop of the vehicle, the oil level OL1 of the gear chamber 15 and the oil level OL2 of the motor chamber 16 are set equally.

Once the vehicle runs, the reduction gear trains 20 and 21 and some other members scoop up the oil X in the direction indicated by arrows X1 in FIG. 3, thereby supplying the oil X to the individual slide members in the gear housing 11. In this case, some of the oil X flows in the direction indicated by arrows X2 and X3 and then reach bearings 45 and 46 in the motor housing 12 via a catch tank 44. Scooping up the oil X in this manner during the running of the vehicle temporarily decreases the amount of the oil X present in the lower portion of the housing 13. In this case, if the oil level OL2 is set above the lower edge 27x of the rotor 27, the oil X flowing in the above manner may increase the rotational resistance of the motor 25, thereby causing a power loss of the drive axle 10. For this reason, the drive axle 10 is equipped with the driven gear 20b, which makes the oil X flow from the motor chamber 16 to the gear chamber 15. In this way, the drive axle 10 actively lowers the oil level OL2 of the motor chamber 16 during the running of the vehicle.

Flow of Oil Created by Helical Gear

Figure 5A:
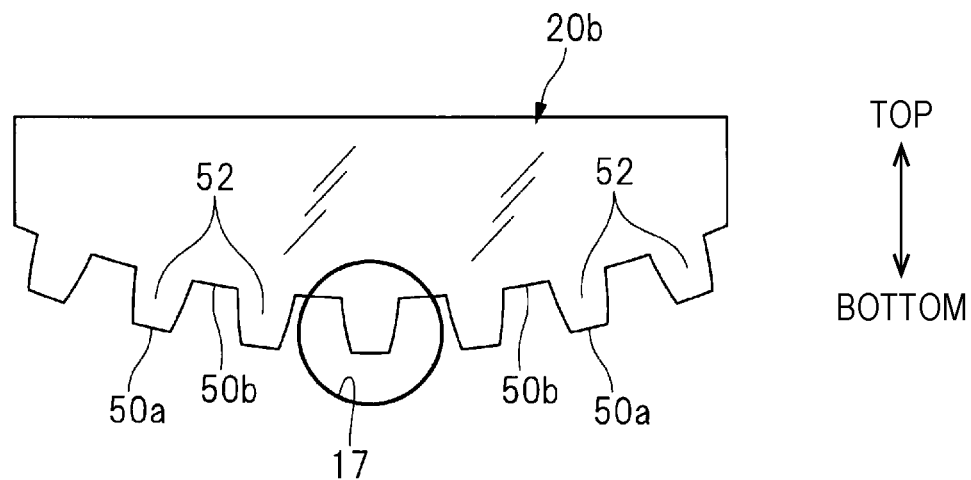
FIG. 5A illustrates the arrangement of the driven gear and the through-hole.
Figure 5B:
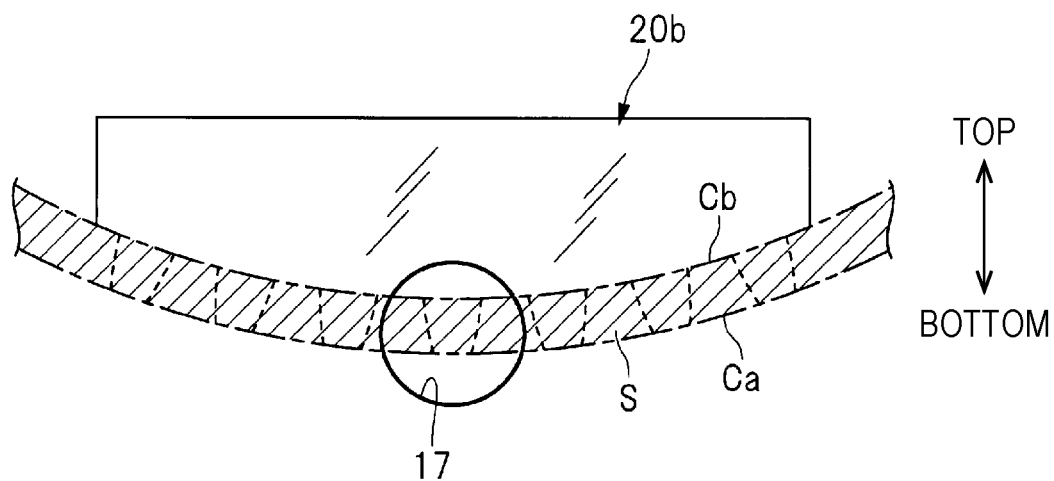
FIG. 5B illustrates the arrangement of a virtual circumferential plane and the through-hole.
Figure 11:
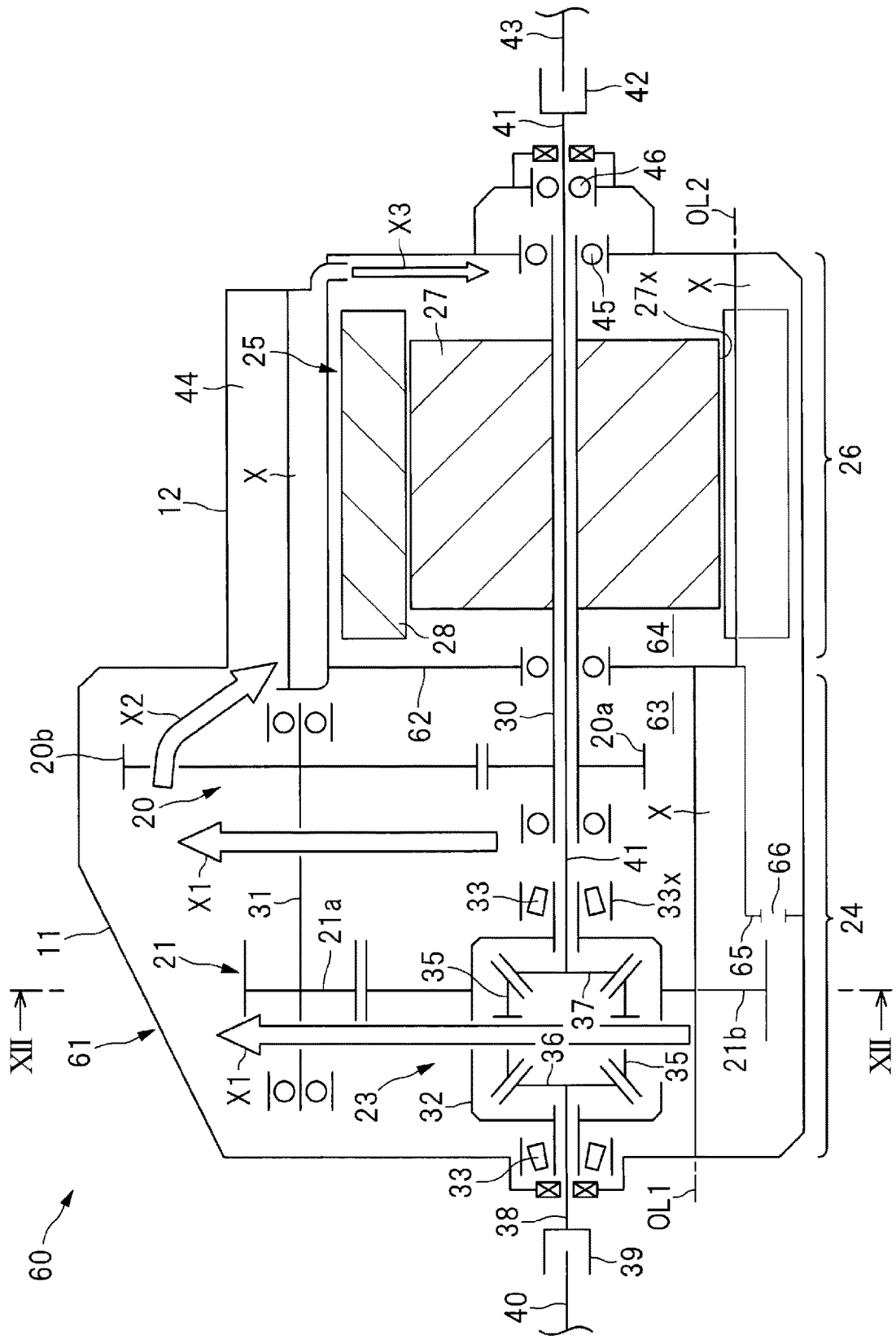
FIG. 11 illustrates a drive axle, which is a gear unit according to a second embodiment of the disclosure.

The flow of the oil X created by the driven gear 20b will be described below. FIG. 4 illustrates the cross-sections of the reduction gear train 20 and the motor 25 taken along the line IV-IV in FIG. 3. FIG. 4 illustrates the arrangement of the reduction gear train 20 and the motor 25. FIGS. 5A and 5B each illustrate the arrangement of the driven gear 20b and the through-hole 17; FIG. 6 illustrates the arrangement of the motor 25 and the through-hole 17. Further, each of FIGS. 5A and 5B illustrates a portion of the driven gear 20b; FIG. 6 illustrates a portion of the motor 25. In each of FIGS. 1 to 3, the positions of the intermediate shaft 31, the driven gear 20b, and the drive gear 21a are shifted upward from their actual ones, for the purpose of a better understanding of the engagements of the individual gears. Therefore, the original vertical positions are illustrated in FIG. 4 or 11 that will be referenced later.

As illustrated in FIG. 4, the reduction gear train 20 is disposed inside the gear chamber 15 in the housing 13. The drive gear 20a of the reduction gear train 20 is disposed around the hollow motor shaft 30, and the driven gear 20b of the reduction gear train 20 engages with the drive gear 20a. The through-hole 17 is formed in the lower portion of the partition 14 disposed inside the housing 13, and allows the gear chamber 15 to communicate with the motor chamber 16. As illustrated in FIGS. 4 and 5A, the through-hole 17 in the partition 14 is positioned at or near the lower edge of the driven gear 20b. In other words, the through-hole 17 coincides with the lower edge of the driven gear 20b in the axial direction parallel to a central axis α of the driven gear 20b. Thus, as illustrated in FIG. 5B, an addendum circle Ca and root circle Cb of the driven gear 20b defines a virtual circumferential plane S, a portion of which coincides with the through-hole 17 in the axial direction parallel to a central axis α of the driven gear 20b. Herein, the addendum circle Ca corresponds to a virtual circle that is drawn by tops 50a of teeth 52 of the driven gear 20b when the driven gear 20b rotates. Likewise, the root circle Cb corresponds to a virtual circle that is drawn by bottoms 50b of the teeth 52 of the driven gear 20b when the driven gear 20b rotates. As illustrated in FIG. 4 or 6, the lower edge 27x of the rotor 27 of the motor 25 is positioned above the through-hole 17.

Figure 7:
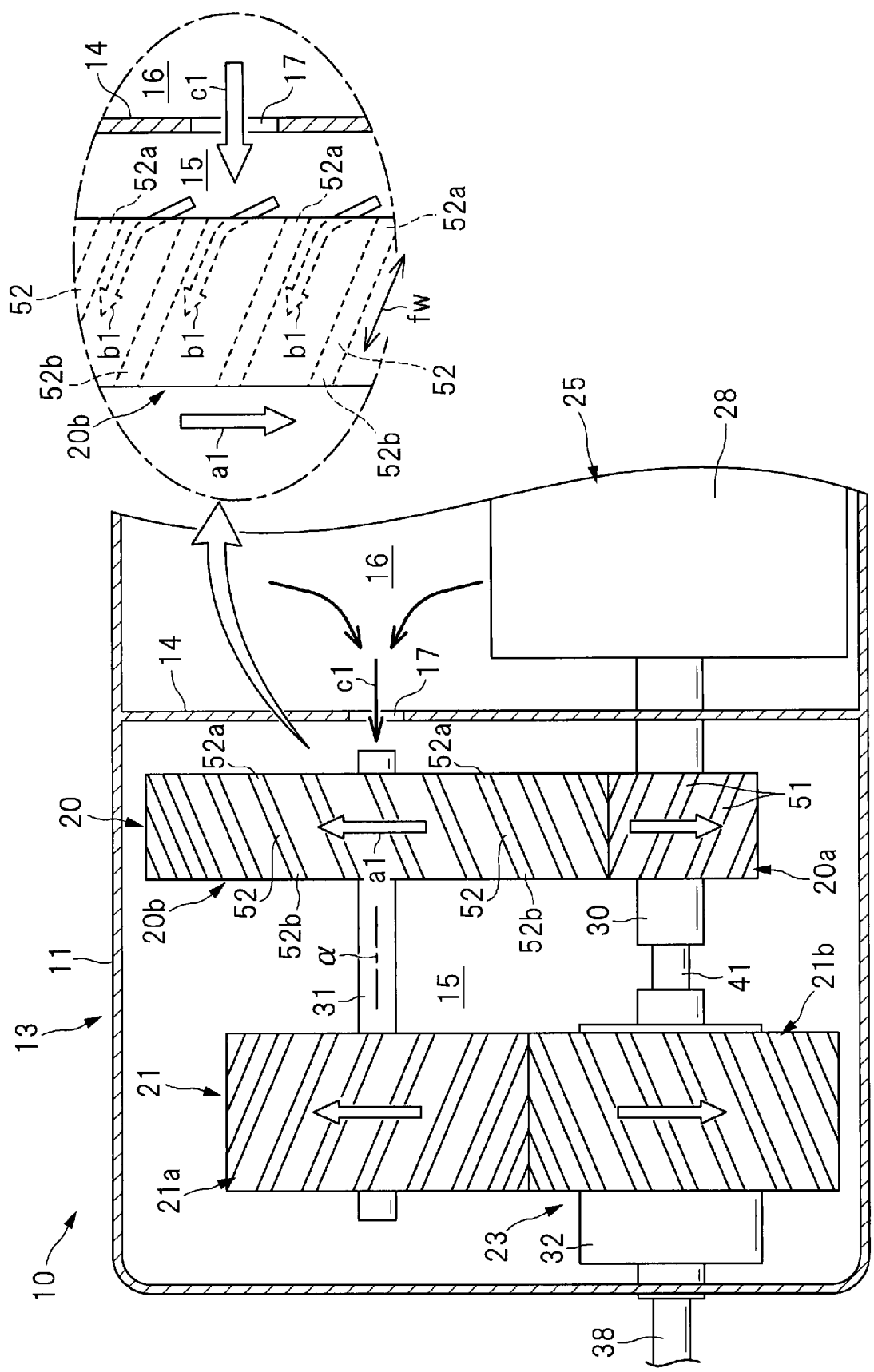
FIG. 7 illustrates the rotational states of the reduction gear trains provided in the drive axle as seen from the top.
Figure 8:
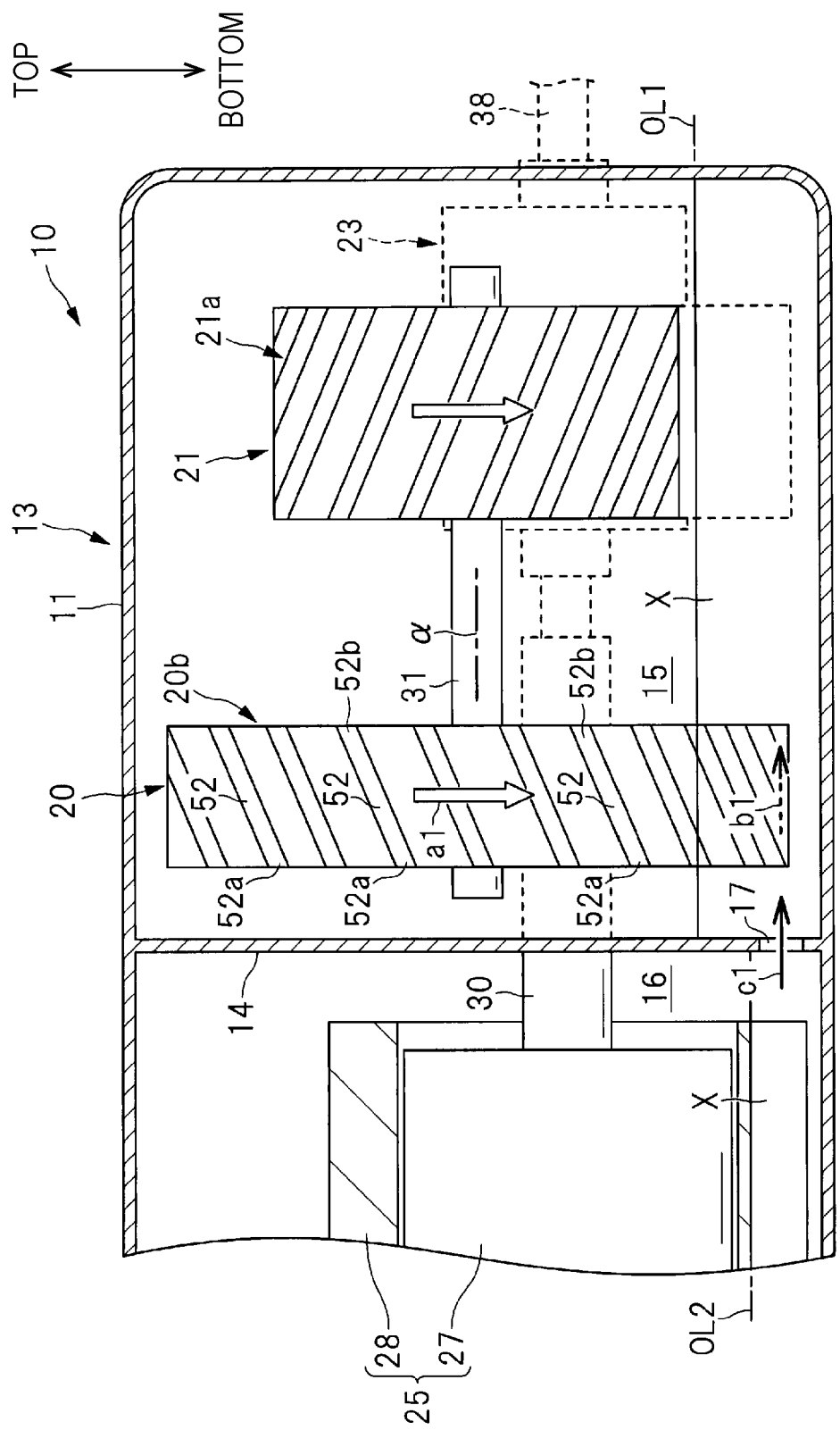
FIG. 8 illustrates the cross-section of the driven gear taken along the line VIII-VIII in FIG. 4.

FIG. 7 illustrates the rotational states of the reduction gear trains 20 and 21 provided in the drive axle 10 as seen from the top. FIG. 8 illustrates the cross-section of the driven gear 20b taken along the line VIII-VIII in FIG. 4. In other words, FIG. 8 illustrates the rotational state of the driven gear 20b. In FIGS. 7 and 8, the arrows indicate the rotational directions of the drive gear 20a, the driven gear 20b, the drive gear 21a, and the driven gear 21b when the vehicle runs forward. FIG. 7 also illustrates, in its right area, the lower circumference of the driven gear 20b and its surrounding part in an enlarged manner.

As illustrated in FIG. 7, the reduction gear train 20 is disposed near the partition 14. Of the reduction gear train 20, the drive gear 20a and the driven gear 20b are each implemented by a helical gear. For example, teeth 51 of the drive gear 20a and the teeth 52 of the driven gear 20b are angled in the respective rotational directions. As illustrated in the right area of FIG. 7, when the driven gear 20b disposed near the through-hole 17 rotates in conjunction with the forward running of the vehicle, the teeth 52 are angled in the rotational direction so as to draw the oil X via the through-hole 17. Each of the teeth 52 in the driven gear 20b has a first end 52a and a second end 52b in a longitudinal direction fw of the teeth 52 illustrated in the right area of FIG. 7. The first end 52a is positioned near the partition 14 and forwarder than the second end 52b in the rotational direction indicated by the arrow al.

Since the tooth trace is created by the teeth 52 of the driven gear 20b in the above manner, when the driven gear 20b rotates in the direction indicated by the arrow al in conjunction with the forward running of the vehicle, the oil X flows along the tooth trace of the driven gear 20b in the direction indicated by arrows b1, as illustrated in FIGS. 7 and 8. In response, the oil X flows into the through-hole 17 in the direction indicated by an arrow c1. In short, when the driven gear 20b rotates in conjunction with the forward running of the vehicle, the oil X flows from the motor chamber 16 into the gear chamber 15 via the through-hole 17. Consequently, the oil level OL1 of the gear chamber 15 becomes higher than the oil level OL2 of the motor chamber 16, as illustrated in FIGS. 3 and 8.

As illustrated in FIG. 6, the lower edge 27x of the rotor 27 of the motor 25 is positioned above the through-hole 17. This configuration enables the oil X to flow from the motor chamber 16 into the gear chamber 15 via the through-hole 17 in response to the rotation of the driven gear 20b, so that the oil level OL2 of the motor chamber 16 becomes lower than the lower edge 27x of the rotor 27. In this way, during the forward running of the vehicle, the drive axle 10 suppresses the motor 25 from stirring the oil X, thereby reducing the rotational resistance of the motor 25. Consequently, it is possible to decrease the power loss.

During the forward running of the vehicle, the drive axle 10 actively lowers the oil level OL2 to reduce the rotational resistance of the motor 25. During the stop of the vehicle, the drive axle 10 keeps the oil level OL1 high. Hence, the hollow motor shaft 30 can move smoothly on the bearings 33 in the differential case 32 immediately after the running of the vehicle, although the reduction gear trains 20 and 21 and some other members do not sufficiently scoop up the oil X. Consequently, this configuration contributes to a high durability of the drive axle 10.

In the above way, the drive axle 10 varies the oil level OL1 of the gear chamber 15 and the oil level OL2 of the motor chamber 16, depending on its operational state. As a result, immediately after the running of the vehicle, the drive axle 10 enables the hollow motor shaft 30 to move smoothly on the bearings 33 in the differential case 32. Then, during the running of the vehicle, the drive axle 10 enables the motor 25 to rotate with little resistance, thereby decreasing the power loss.

Position of Through-Hole

As described with reference to FIG. 6, the through-hole 17 is formed in the portion of the partition 14 below the lower edge 27x of the rotor 27 of the motor 25. Further, both a lower edge 17x and upper edge 17y of the through-hole 17 are positioned below the lower edge 27x of the rotor 27. However, the positional relationship between the lower edge 27x and each of the lower edge 17x and the upper edge 17y is not limited. To reduce the rotational resistance of the rotor 27, the lower edge 17x is basically positioned below the lower edge 27x of the rotor 27, but the upper edge 17y of the through-hole 17 may be positioned above the lower edge 27x.

Figure 9:
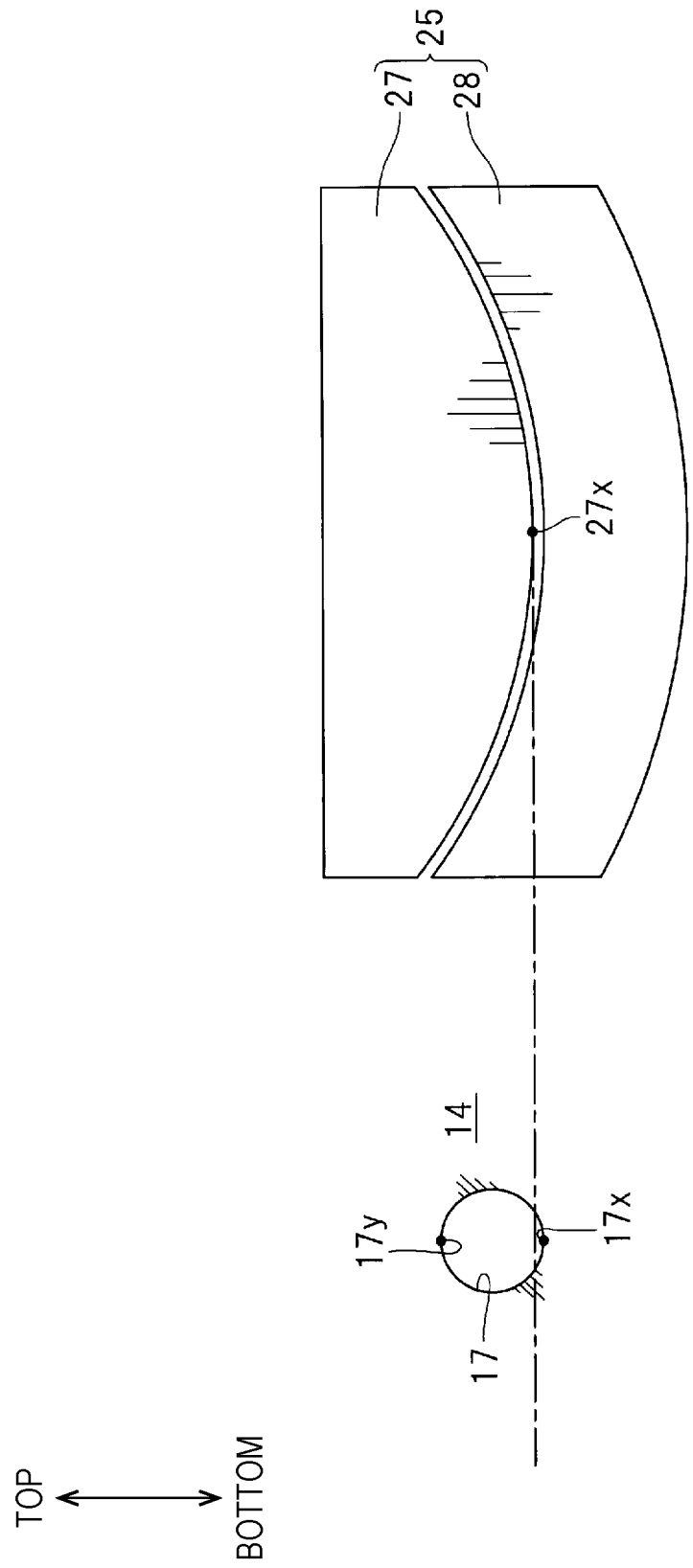
FIG. 9 illustrates a modification of the arrangement of the motor and the through-hole.

FIG. 9 illustrates a modification of the arrangement of the motor 25 and the through-hole 17. As illustrated in FIG. 9, the lower edge 17x of the through-hole 17 may be positioned below the lower edge 27x of the rotor 27, but the upper edge 17y of the through-hole 17 may be positioned above the lower edge 27x. This configuration can also lower the oil level OL2 to decrease the amount of the oil X in contact with the rotor 27 during the forward running of the vehicle, thereby suppressing the motor 25 from stirring the oil X. As a result, the rotational resistance of the motor 25 is reduced, and the power loss thereby decreases.

Figure 10A:
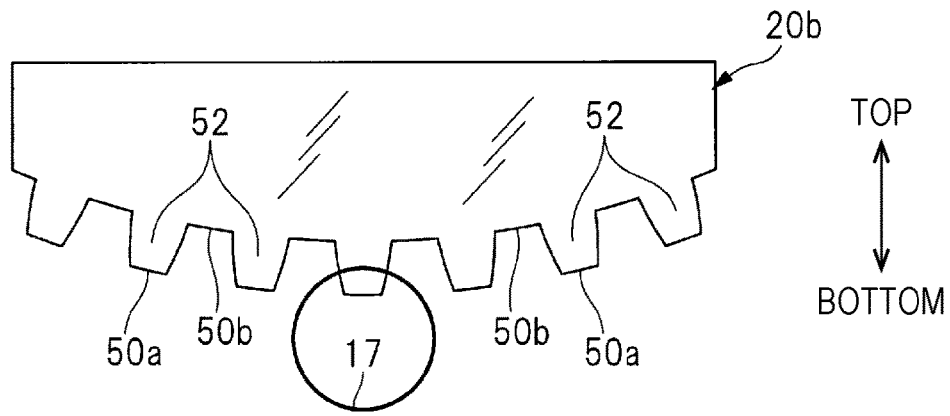
FIG. 10A illustrates a first modification of the arrangement of the driven gear and the through-hole.
Figure 10B:
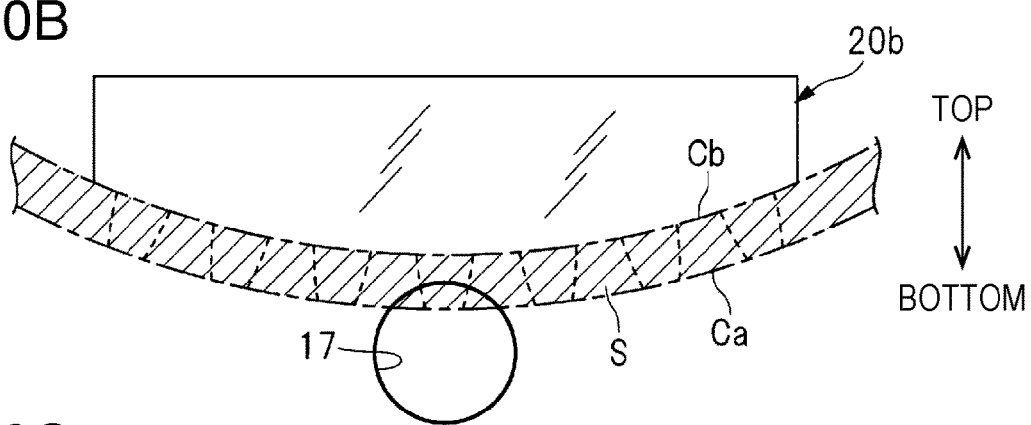
FIG. 10B illustrates the first modification of the arrangement of the virtual circumferential plane and the through-hole.
Figure 10C:
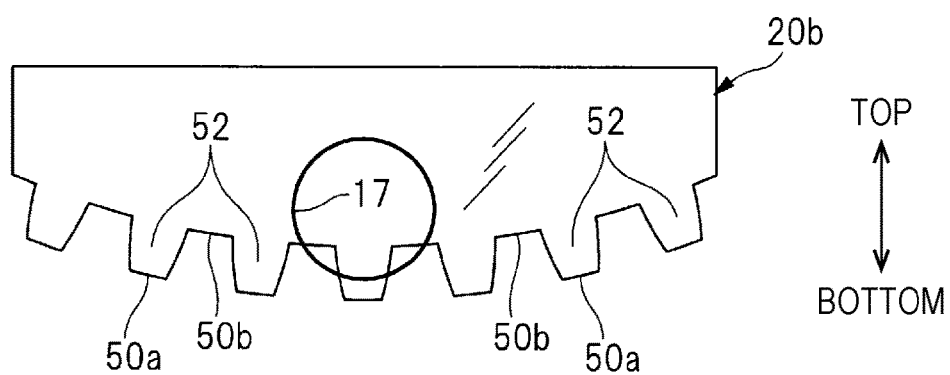
FIG. 10C illustrates a second modification of the arrangement of the driven gear and the through-hole.
Figure 10D:
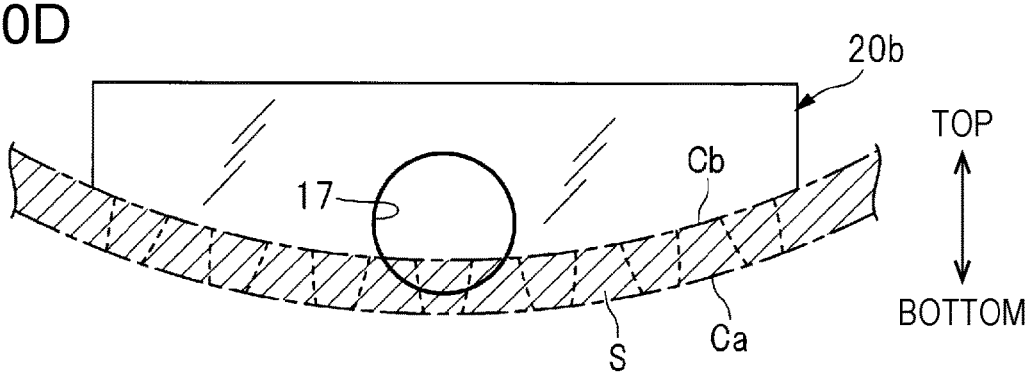
FIG. 10D illustrates the second modification of the arrangement of the virtual circumferential plane and the through-hole.

As illustrated in FIGS. 5A and 5B, the through-hole 17 formed in the partition 14 coincides with both of the addendum circle Ca and root circle Cb of the driven gear 20b in the axial direction parallel to the central axis α of the driven gear 20b. However, the through-hole 17 formed in the partition 14 may coincide with an either one of the addendum circle Ca and the root circle Cb in the axial direction parallel to the central axis α. This configuration can also make the oil X flow from the motor chamber 16 into the gear chamber 15 through the through-hole 17. FIGS. 10A to 10D illustrate modifications of the arrangement of the driven gear 20b and the through-hole 17. Further, FIGS. 10A and 10B illustrate one modification, and FIGS. 10C and 10D illustrate another modification.

As illustrated in FIGS. 10A and 10B, the through-hole 17 may coincide with the addendum circle Ca of the driven gear 20b but may not coincide with the root circle Cb of the driven gear 20b, in the axial direction parallel to the central axis α of the driven gear 20b. In addition, the through-hole 17 formed in the partition 14 may coincide with a portion of the virtual circumferential plane S defined by the addendum circle Ca and root circle Cb of the driven gear 20b in the axial direction parallel to the central axis α of the driven gear 20b. This configuration can also make the oil X flow from the motor chamber 16 into the gear chamber 15 via the through-hole 17 when the driven gear 20b rotates in conjunction with the forward running of the vehicle, similar to the configuration illustrated in FIG. 8. Consequently, it is possible to set the oil level OL1 of the gear chamber 15 to be higher than the oil level OL2 of the motor chamber 16.

As illustrated in FIGS. 10C and 10D, the through-hole 17 may coincide with the root circle Cb of the driven gear 20b but may not coincide with the addendum circle Ca of the driven gear 20b in the axial direction parallel to the central axis α of the driven gear 20b. In addition, the through-hole 17 formed in the partition 14 may coincide with a portion of the virtual circumferential plane S defined by the addendum circle Ca and root circle Cb of the driven gear 20b in the axial direction parallel to the central axis α of the driven gear 20b. This configuration can also make the oil X flow from the motor chamber 16 into the gear chamber 15 via the through-hole 17 when the driven gear 20b rotates in conjunction with the forward running of the vehicle, similar to the configuration illustrated in FIG. 8. Consequently, it is possible to set the oil level OL1 of the gear chamber 15 to be higher than the oil level OL2 of the motor chamber 16.

Second Embodiment

Figure 12:
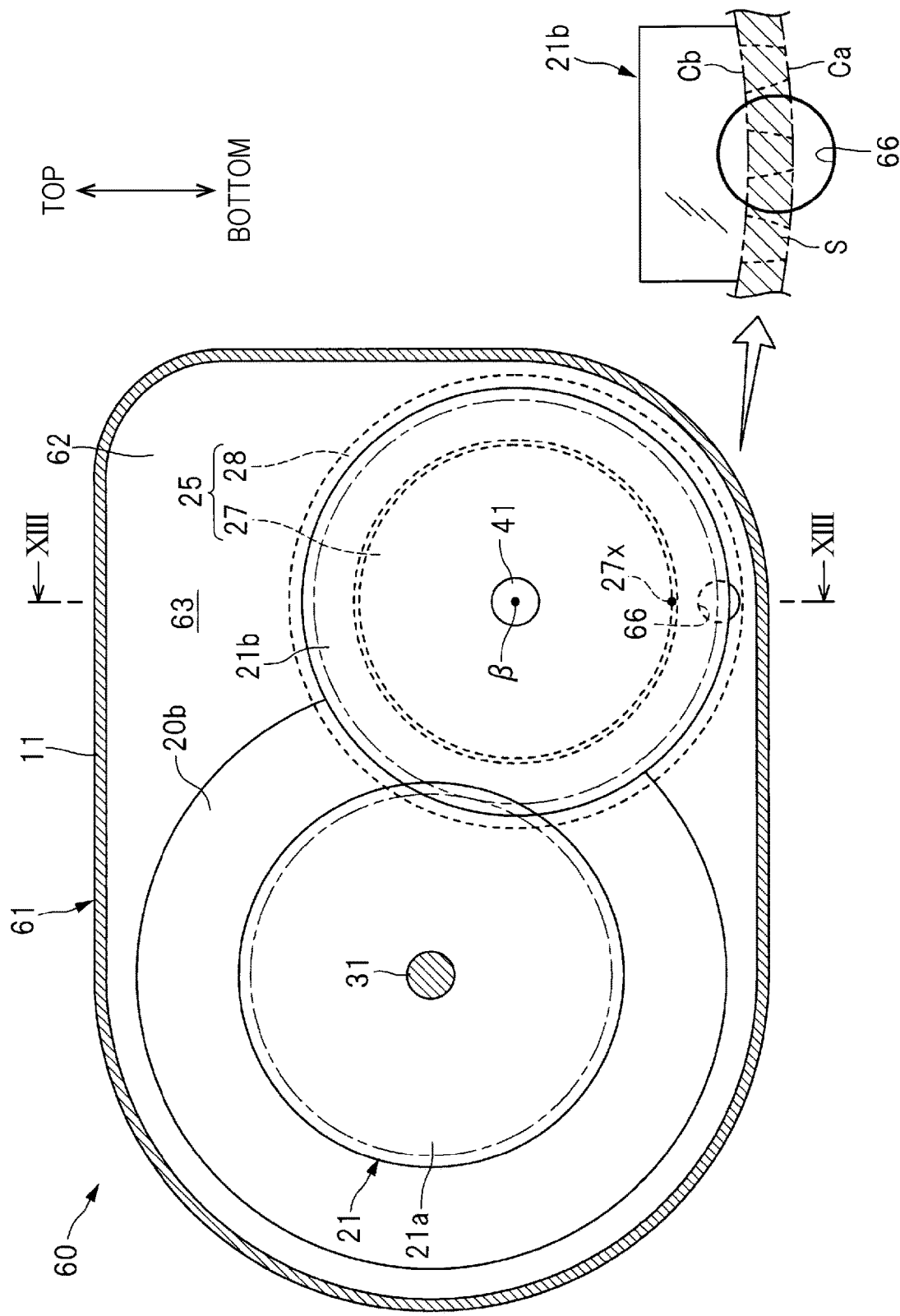
FIG. 12 illustrates the cross-sections of the reduction gear train and the motor taken along the line XII-XII in FIG. 11.
Figure 13:
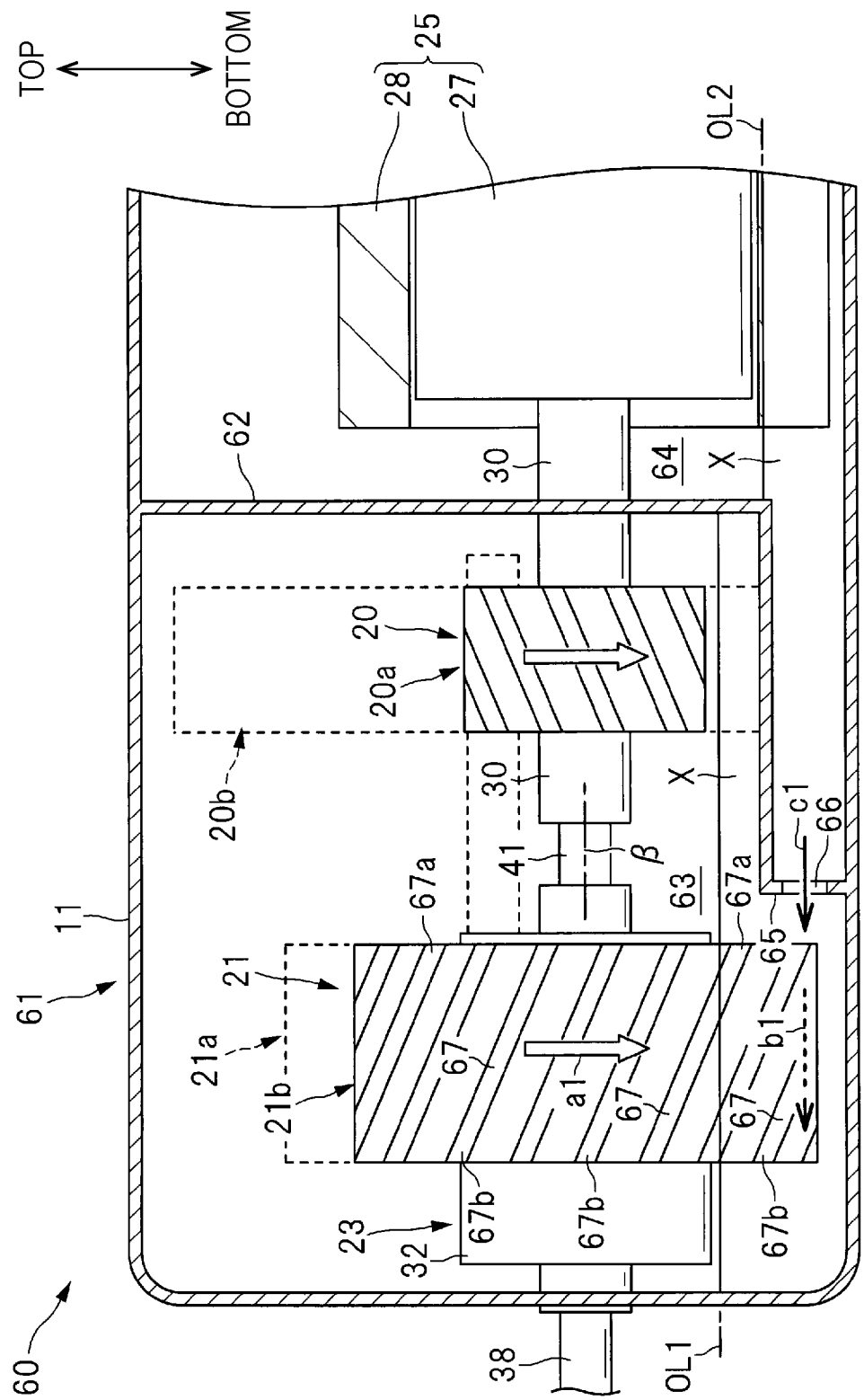
FIG. 13 illustrates the cross-section of the driven gear taken along the line XIII-XIII in FIG. 12.

In the foregoing embodiment, the driven gear 20b of the reduction gear train 20 makes the oil X flow from the motor chamber 16 into the gear chamber 15. Aside from the driven gear 20b, another gear may make the oil X flow from the motor chamber 16 into the gear chamber 15. FIG. 11 illustrates a drive axle 60, which is a gear unit according to a second embodiment of the disclosure. FIG. 12 illustrates the cross-sections of a reduction gear train 21 and a motor 25 taken along the line XII-XII in FIG. 11. FIG. 12 illustrates the positional relationship between the reduction gear train 21 and the motor 25. FIG. 13 illustrates the cross-section of a driven gear 21b taken along the line XIII-XIII in FIG. 12. It is to be noted that members in FIG. 11 which are identical to those in FIG. 1 are given the same characters and will not be described below.

As illustrated in FIG. 11, the drive axle 60 includes a housing 61 constituted by a gear housing 11 and a motor housing 12. The housing 61 has a partition 62 inside which defines a gear chamber 63 and a motor chamber 64. In one embodiment, the gear chamber 63 may serve as the first oil chamber, and the motor chamber 64 may serve as the second oil chamber. As illustrated in FIGS. 11 and 13, the partition 62 has a lower portion with a wall 65 protruding toward the driven gear 21b. The wall 65 has a through-hole 66 via which the gear chamber 63 communicates with the motor chamber 64.

As illustrated in FIGS. 11 to 13, the through-hole 66 in the partition 62 is positioned near the lower edge of the driven gear 21b provided in a differential case 32. In other words, the through-hole 66 coincides with the lower edge of the driven gear 21b in the axial direction parallel to a central axis β of the driven gear 21b. As illustrated in the right area of FIG. 12, the through-hole 66 coincides with a portion of a virtual circumferential plane S defined by an addendum circle Ca and root circle Cb of the driven gear 21b, in the axial direction parallel to the central axis β of the driven gear 21b. In addition, the through-hole 66 is positioned below a lower edge 27x of a rotor 27 of the motor 25.

As illustrated in FIG. 13, the driven gear 21b positioned near the through-hole 66 is a helical gear with teeth 67 angled in the rotational direction. Further, the teeth 67 are angled in the rotational direction so as to draw the oil X via the through-hole 17 when the drive gear 21a rotates in conjunction with the forward running of the vehicle. Each of the teeth 67 has a first end 67a and a second end 67b along the width of the driven gear 21b. The first end 67a is positioned near the partition 62 and forwarder than the second end 67b in the rotational direction indicated by an arrow al.

Since the tooth trace is created by the teeth 67 of the driven gear 21b in the above manner, when the driven gear 21b rotates in the direction indicated by the arrow al in conjunction with the forward running of the vehicle, the oil X flows along the tooth trace of the driven gear 21b in the direction indicated by an arrow b1, as illustrated in FIG. 13. In response, the oil X flows into the through-hole 66 in the direction indicated by an arrow c1. In short, when the driven gear 21b rotates in conjunction with the forward running of the vehicle, the oil X flows from the motor chamber 64 into the gear chamber 63 via the through-hole 66. As a result, the oil level OL1 of the gear chamber 63 becomes higher than the oil level OL2 of the motor chamber 64. In this way, the drive axle 60 produces the same effect as the drive axle 10 described above.

Third Embodiment

Figure 14:
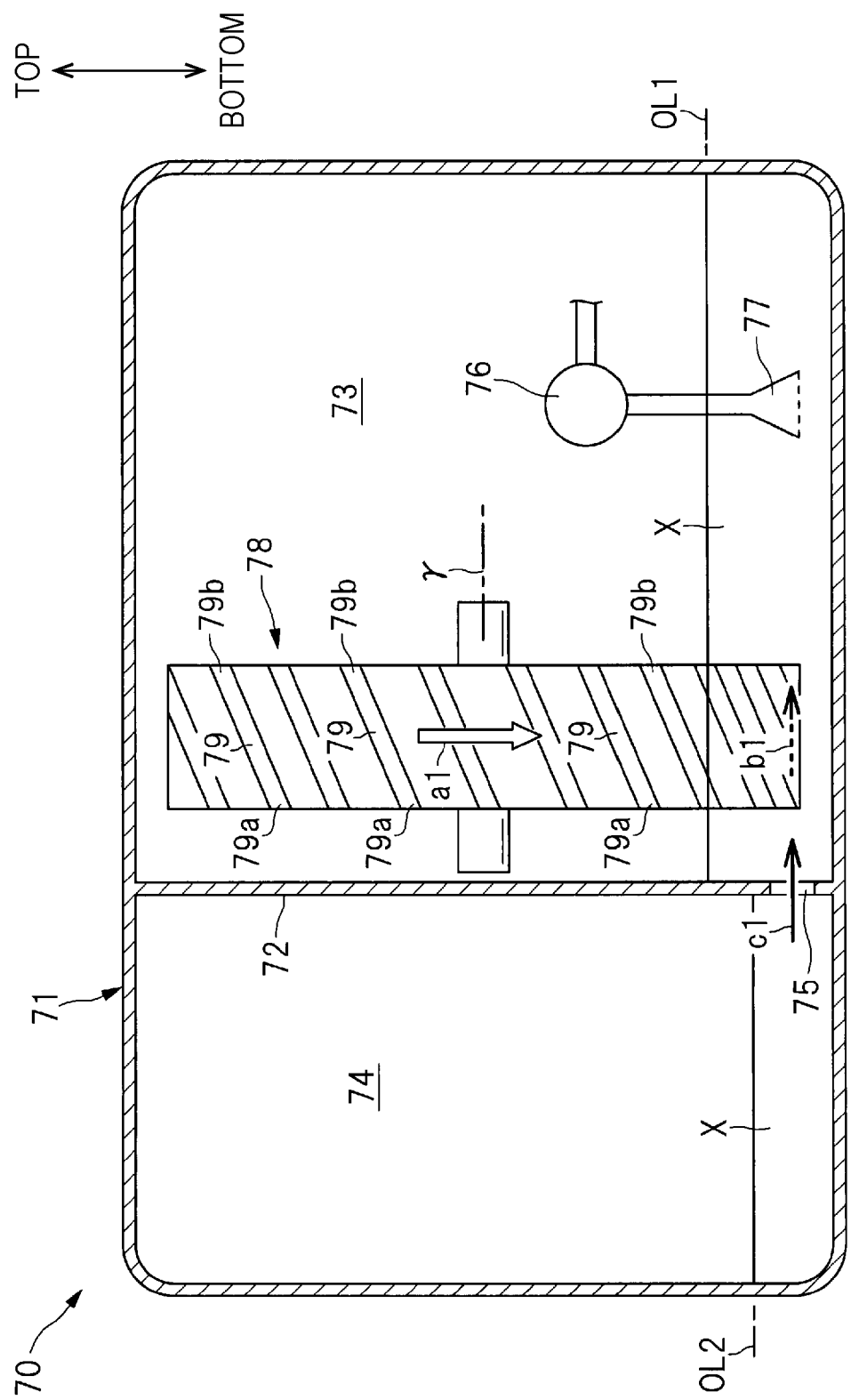
FIG. 14 illustrates a portion of a transmission, which is a gear unit according to a third embodiment of the disclosure.

As described above, the drive axle 10 implements the gear unit according to the first embodiment, and the drive axle 60 implements the gear unit according to the second embodiment. Aside from the drive axles 10 and 60, a transmission 70 may implement a gear unit according to a third embodiment of the disclosure. FIG. 14 illustrates a portion of the transmission 70, which is a gear unit according to a third embodiment of the disclosure.

As illustrated in FIG. 14, the transmission 70 has a housing 71 that contains an oil X. The housing 71 has a partition 72 inside which defines a first oil chamber 73 and a second oil chamber 74. The partition 72 has a lower portion with a through-hole 75, via which the first oil chamber 73 communicates with the second oil chamber 74. The first oil chamber 73 accommodates an oil pump 76, an oil strainer 77, and a gear member 78. The oil strainer 77 serves as a suction hole of the oil pump 76, and the gear member 78 is a portion of a gear train for use in varying the speed of the vehicle, for instance.

The partition 72 has a through-hole 75 positioned near the lower edge of the gear member 78 within the first oil chamber 73. The through-hole 75 coincides with the lower edge of the gear member 78 in the axial direction parallel to a central axis γ of the gear member 78. Similar to the configurations described with reference to FIGS. 5A, 5B, and 10, the through-hole 75 coincides with a portion of a virtual circumferential plane defined by an addendum circle and root circle of the gear member 78, in the axial direction parallel to the central axis γ of the gear member 78. The gear member 78 positioned near the through-hole 75 is a helical gear with teeth 79 angled in a rotational direction indicated by an arrow al. The teeth 79 make the oil X flow from the second oil chamber 74 into the first oil chamber 73 via the through-hole 75 when the gear member 78 rotates in conjunction with the forward running of the vehicle. Each of the teeth 79 has a first end 79a and a second end 79b along the width of the gear member 78. The first end 79a is positioned near the partition 72 and forwarder than the second end 79b in the rotational direction of the gear member 78 indicated by the arrow al.

Since the tooth trace is created by the teeth 79 of the gear member 78 in the above manner, when the gear member 78 rotates in the direction indicated by the arrow al in conjunction with the forward running of the vehicle, the oil X flows along the tooth trace of the gear member 78 in the direction indicated by an arrow b1. In response, the oil X flows into the through-hole 75 in the direction indicated by an arrow c1. In short, when the gear member 78 rotates in conjunction with the forward running of the vehicle, the oil X flows from the second oil chamber 74 into the first oil chamber 73 via the through-hole 75, so that an oil level OL1 of the first oil chamber 73 becomes higher than an oil level OL2 of the second oil chamber 74.

In the above way, the transmission 70 actively raises the oil level OL1 of the first oil chamber 73. Even if only a small amount of oil X is left in the housing 71, the oil X can smoothly flow into the oil strainer 77 of the oil pump 76. This configuration varies the oil level OL1 of the first oil chamber 73 and the oil level OL2 of second oil chamber 74, depending on the operational state of the transmission 70. Consequently, it is possible to cause the oil pump 76 to operate properly without using a large amount of oil X in the housing 71.

The foregoing first to third embodiments may be modified in various ways without the scope of the claims. As described above, each of the drive axles 10 and 60 and the transmission 70 implements a gear unit according to an embodiment of the disclosure. However, any other apparatus with one or more helical gears may implement the gear unit. In the configurations illustrated in FIGS. 5A, 5B, and 10A to 10D, the through-hole 17 coincides with one or both of the addendum circle Ca and root circle Cb of the driven gear 20b. However, the through-hole 17 does not necessarily have to coincide with one or both of the addendum circle Ca and root circle Cb. Alternatively, the addendum circle Ca of the virtual circumferential plane S may be positioned below the lower edge 17x of the through-hole 17, and the root circle Cb of the virtual circumferential plane S may be positioned above the upper edge 17y of the through-hole 17. Even in this case, the through-hole 17 can coincide with a portion of the virtual circumferential plane S.

To vary the oil levels OL1 and OL2, the configuration in FIGS. 1 and 8 in which the driven gear 20b draws the oil X via the through-hole 17 may be combined with the configuration in FIGS. 11 and 13 in which the driven gear 21b draws the oil X via the through-hole 66. Furthermore, instead of forming the through-hole 17 near the lower edge of the driven gear 20b as illustrated in FIGS. 5A and 5B and 10A to 10D, the through-hole 17 may be formed near the circumference of the driven gear 20b. In short, the through-hole 17 may be formed in a plane other than a vertical plane traversing the central axis α of the driven gear 20b.

In a drive axle 10, a through-hole 17 formed in a partition 14 coincides with a portion of a virtual circumferential plane S defined by an addendum circle Ca and root circle Cb of a driven gear 20b in the axial direction parallel to a central axis α of a driven gear 20b. When the driven gear 20b rotates in conjunction with the running of the vehicle, an oil X flows from a motor chamber 16 into a gear chamber 15 so that an oil level OL1 of the gear chamber 15 becomes higher than an oil level OL2 of the motor chamber 16. In this way, the drive axle 10 varies an oil level, depending on its operational state.

The invention claimed is:

1. A gear unit to be mounted in a vehicle, the gear unit further comprising:
    a housing configured to store oil;
    a partition disposed inside the housing, the partition defining a first oil chamber and a second oil chamber, the partition having a through-hole that allows the first oil chamber to communicate with the second oil chamber;
    a helical gear configured to rotate during running of the vehicle,
        the helical gear being disposed inside the first oil chamber,
        the helical gear having an angled tooth,
        a tip of the angled tooth drawing an addendum circle,
        a bottom of the angled tooth drawing a root circle,
        both the addendum circle and the root circle defining a virtual circumferential plane, wherein
    the through-hole coincides with a portion of the virtual circumferential plane in an axial direction parallel to a central axis of the helical gear, and
    when the helical gear rotates in conjunction with the running of the vehicle, the oil flows from the second oil chamber into the first oil chamber so that an oil level of the first oil chamber becomes higher than an oil level of the second oil chamber; and
    a motor having a rotor, the motor being disposed inside the second oil chamber,
    wherein
    a lower edge of the rotor is positioned higher than a lower edge of the through-hole.

2. The gear unit according to claim 1, wherein the lower edge of the rotor is positioned lower than the oil level of the second oil chamber during a stop of the vehicle.

3. The gear unit according to claim 2, further comprising a differential case disposed inside the first oil chamber, the differential case being supported by a bearing, wherein a lower edge of the bearing is positioned higher than the lower edge of the rotor that the motor has.

4. The gear unit according to claim 3, wherein the lower edge of the bearing is positioned lower than the oil level of the first oil chamber during the stop of the vehicle.

5. The gear unit according to claim 1, further comprising a differential case disposed inside the first oil chamber, the differential case being supported by a bearing, wherein a lower edge of the bearing is positioned higher than the lower edge of the rotor that the motor has.

6. The gear unit according to claim 5, wherein the lower edge of the bearing is positioned lower than the oil level of the first oil chamber during the stop of the vehicle.

7. A gear unit to be mounted in a vehicle, the gear unit comprising:
    a housing configured to store oil;
    a partition disposed inside the housing, the partition defining a first oil chamber and a second oil chamber, the partition having a through-hole that allows the first oil chamber to communicate with the second oil chamber;
    a motor having a rotor, the motor being disposed inside the second oil chamber, wherein a lower edge of the rotor is positioned higher than a lower edge of the through-hole; and
    a helical gear configured to rotate during running of the vehicle,
        the helical gear being disposed inside the first oil chamber,
        the helical gear having an angled tooth angled in a rotational direction configured to draw the oil from the second oil chamber to the first oil chamber via the through-hole when the helical gear rotates in conjunction with forward running of the vehicle,
        a tip of the angled tooth drawing an addendum circle,
        a bottom of the angled tooth drawing a root circle, and
        both the addendum circle and the root circle defining a virtual circumferential plane, wherein
    the through-hole coincides with a portion of the virtual circumferential plane in an axial direction parallel to a central axis of the helical gear, and
    when the helical gear rotates in conjunction with the running of the vehicle, the oil flows from the second oil chamber into the first oil chamber so that an oil level of the first oil chamber becomes higher than an oil level of the second oil chamber.

8. The gear unit according to claim 7, wherein
the lower edge of the rotor is positioned lower than the oil level of the second oil chamber during a stop of the vehicle.

9. The gear unit according to claim 8, further comprising a differential case disposed inside the first oil chamber, the differential case being supported by a bearing, wherein
a lower edge of the bearing is positioned higher than the lower edge of the rotor that the motor has.

10. The gear unit according to claim 9, wherein
the lower edge of the bearing is positioned lower than the oil level of the first oil chamber during the stop of the vehicle.

11. The gear unit according to claim 7, further comprising a differential case disposed inside the first oil chamber, the differential case being supported by a bearing, wherein
a lower edge of the bearing is positioned higher than the lower edge of the rotor that the motor has.

12. The gear unit according to claim 11, wherein
the lower edge of the bearing is positioned lower than the oil level of the first oil chamber during the stop of the vehicle.

\* \* \* \* \*